United States Patent
Yoshiya

(10) Patent No.: US 10,900,811 B2
(45) Date of Patent: Jan. 26, 2021

(54) DISPLACEMENT DETECTION DEVICE

(71) Applicant: MELEXIS TECHNOLOGIES SA, Bevaix (CH)

(72) Inventor: Takumi Yoshiya, Yokohama (JP)

(73) Assignee: MELEXIS TECHNOLOGIES SA, Bevaix (CH)

(*) Notice: Subject to any disclaimer, the term of this patent is extended or adjusted under 35 U.S.C. 154(b) by 504 days.

(21) Appl. No.: 15/654,992

(22) Filed: Jul. 20, 2017

(65) Prior Publication Data
US 2018/0023979 A1  Jan. 25, 2018

(30) Foreign Application Priority Data
Jul. 20, 2016 (JP) .................... 2016-142450

(51) Int. Cl.
| | | |
|---|---|---|
| *G01D 5/20* | (2006.01) | |
| *G01D 5/12* | (2006.01) | |
| *G01D 7/08* | (2006.01) | |
| *G01D 5/14* | (2006.01) | |
| *G01D 5/04* | (2006.01) | |

(52) U.S. Cl.
CPC .......... *G01D 5/20* (2013.01); *G01D 5/04* (2013.01); *G01D 5/12* (2013.01); *G01D 5/142* (2013.01); *G01D 5/145* (2013.01); *G01D 7/08* (2013.01)

(58) Field of Classification Search
None
See application file for complete search history.

(56) References Cited

U.S. PATENT DOCUMENTS 5,691,637 A * 11/1997 Oswald ............... G01B 7/004
  324/207.2
6,184,679 B1   2/2001 Popovic et al.
(Continued)

FOREIGN PATENT DOCUMENTS

CN   101331385 A   12/2008
EP   1962062 A1   8/2008
(Continued)

OTHER PUBLICATIONS

European Search Report including European Search Opinion issued to the corresponding European application No. 17182261.2 dated Dec. 8, 2017.

(Continued)

*Primary Examiner* — Gregory J Toatley, Jr.
*Assistant Examiner* — Brandon J Becker
(74) *Attorney, Agent, or Firm* — Hauptman Ham, LLP

(57) ABSTRACT

Provided is a displacement detection device which can uniquely determine displacement of a detection target from output values based on detection as well as make a displacement range of the detection target wider than a displacement range detectable by a sensor.

A displacement detection device includes a magnet which is displaced in a displacement direction Ds, is rod-shaped and has a form in which a longitudinal direction and the displacement direction Ds form a predetermined angle θ, and a sensor IC which detects a magnetic flux density of a magnetic field formed by the magnet in an x direction and a z direction orthogonal to the displacement direction Ds and outputs a signal proportional to the magnetic field detected.

16 Claims, 20 Drawing Sheets

(56) References Cited

U.S. PATENT DOCUMENTS

| | | | |
|---|---|---|---|
| 7,090,636 B2* | 8/2006 | Kent | A61K 9/5094 |
| | | | 600/9 |
| 8,664,945 B2 | 3/2014 | Laville et al. | |
| 2008/0297288 A1* | 12/2008 | Irwin | H01F 7/1615 |
| | | | 335/254 |
| 2011/0080162 A1* | 4/2011 | Steinich | G01D 5/145 |
| | | | 324/207.25 |
| 2014/0087483 A1* | 3/2014 | Ohsawa | H01J 37/3053 |
| | | | 438/3 |
| 2014/0225596 A1* | 8/2014 | Nakamura | G01R 33/07 |
| | | | 324/207.2 |

FOREIGN PATENT DOCUMENTS

| | | |
|---|---|---|
| GB | 1416940 | 12/1975 |
| JP | 6-229708 A | 8/1994 |
| JP | 2011-257432 A | 12/2011 |
| JP | 2014-190711 A | 10/2014 |
| WO | 2007069680 A | 6/2007 |

OTHER PUBLICATIONS

Chinese Office Action issued to the corresponding Chinese application No. 201710593168.1 dated Mar. 29, 2019, With machine English translation.

Second Chinese Office Action issued to the corresponding Chinese application No. 201710593168.1 dated Aug. 13, 2019, With machine English translation.

Kai Sun "Development of three dimensional silicon hall sensor;" Full-text database information technology series of Chinese excellent Master's thesis article database, No. 3 (May 2013). With English translation.

* cited by examiner

DISPLACEMENT DETECTION DEVICE

The present application is based on Japanese patent application No. 2016-142450, filed on Jul. 20, 2016, the entire contents of which are incorporated herein by reference.

BACKGROUND OF THE INVENTION

Field of the Invention

One embodiment of the invention relates to a displacement detection device.

Description of the Related Art

As a conventional technique, a displacement detection device, which performs non-contact detection of a rotation angle of a rotation body, has been suggested (refer to Japanese Unexamined Patent Publication No. 2011-257432).

The displacement detection device in the referred document includes: a magnetic body which is provided on the outer peripheral surface of a cylindrical rotation body, is arranged so as to rotate about the outer peripheral surface of the rotation body while being tilted substantially linearly against the rotation direction of the rotation body, and serves as a target detection body; two magnetoresistive elements which are arranged to face the magnetic body and arranged with an interval the axial direction of the rotation body; and a magnet which applies a bias magnetic field to the magnetoresistive elements. In this displacement detection device, the two magnetoresistive elements are connected in series, and a constant voltage is applied to both ends to measure a resistance value between the two magnetoresistive elements. As the rotation body rotates, the bias magnetic field attracted the magnetic body changes. This causes a change in the balance of the magnetoresistance of the two magnetoresistive elements, and a voltage according to the rotation angle of the rotation body is outputted from between the magnetoresistive elements. Thus, the rotation of the rotation body can be detected from the voltage. Moreover, by providing the displacement detection devices in a plurality of axes, a relative angle difference among the plurality of axes can be detected from differences among the output signals of the displacement detection devices to calculate a torque amount.

The displacement detection device in the referred document can perform accurate detection even when the change in the rotation angle is minute since the voltage outputted according to the rotation of the rotation body periodically changes and the periodic change linearly increases and decreases. However, the detection device has a problem that the rotation angle cannot be uniquely determined from the output values since the increase and the decrease occur, and the rotation angle cannot be determined unless the change (either increase or decrease) in the output values is known.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF THE PREFERRED EMBODIMENT

Various embodiments according to the invention will be described hereinafter with reference to the accompanying drawings. In general, according to one embodiment of the invention, there is provided a displacement detection device, including:

a magnet which is displaced in one direction, is rod-shaped and has a form in which a longitudinal direction and the one direction form a predetermined angle; and a sensor which detects a magnetic flux density of a magnetic field formed by the magnet in a direction orthogonal to at least the one direction and a magnetization direction of the magnet and outputs a signal proportional to the magnetic field detected.

According to an invention, it is possible to uniquely determine the displacement of the detection target from the output values based on detection as well as make the displacement range of the detection target wider than the displacement range detectable by the sensor.

Hereinafter, embodiments of the invention will be described in detail with reference to the accompanying drawings.

First Embodiment (Configuration of Displacement Detection Device)

Figure 1:
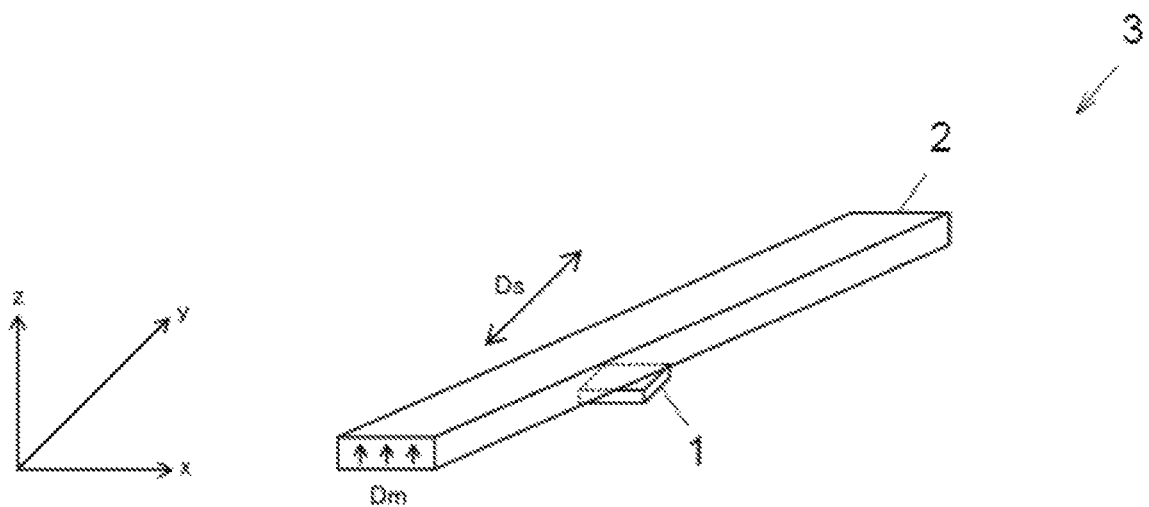
FIG. 1 is an exemplary perspective view showing a configuration example of a displacement detection device according to the first embodiment.
Figure 2A:
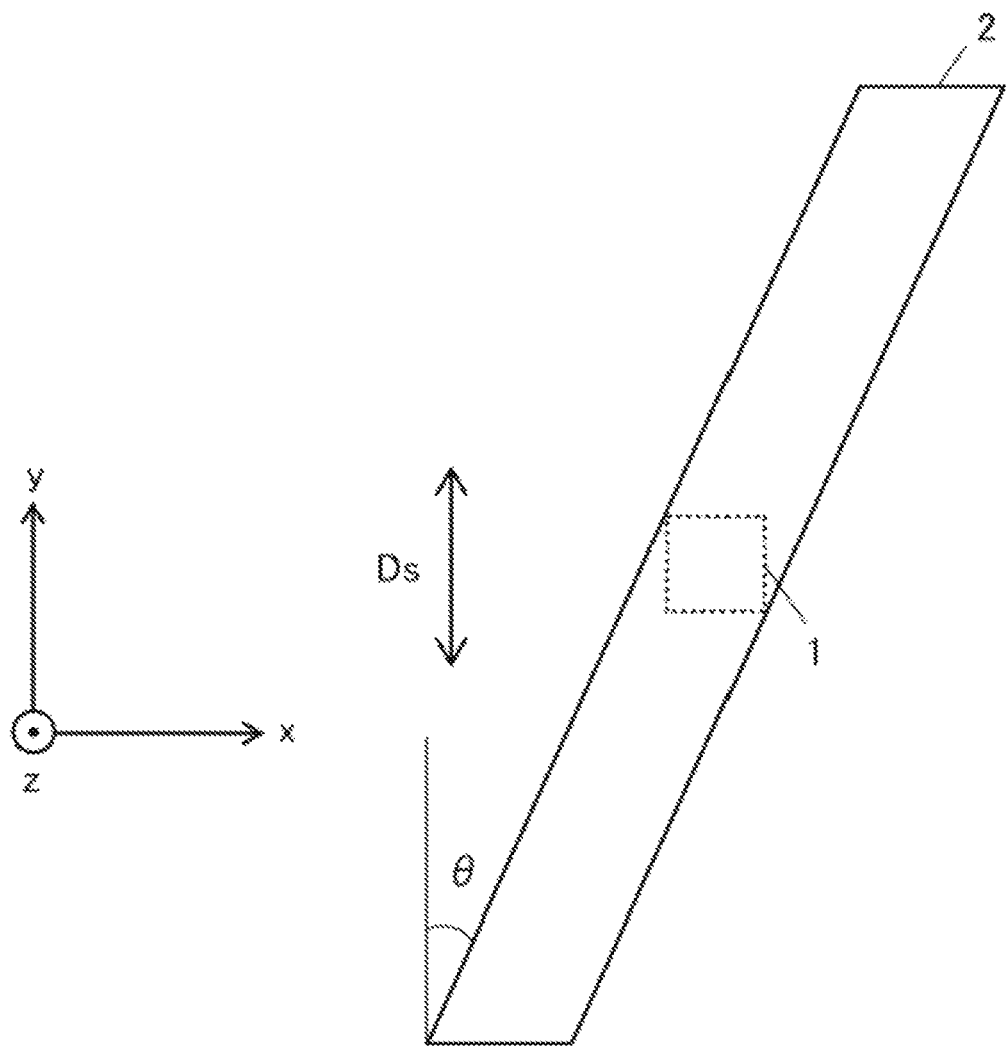
FIG. 2A and FIG. 2B are an exemplary plan view and a side view showing the configuration of the displacement detection device, respectively.
Figure 2B:
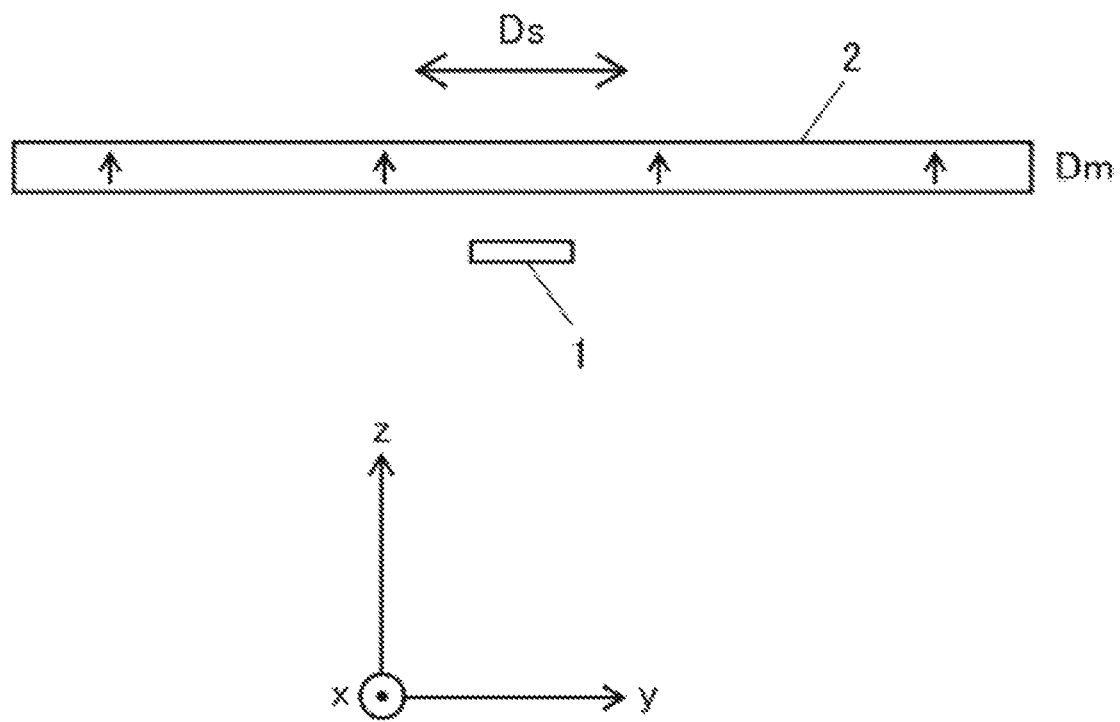

FIG. 1 is a perspective view showing a configuration example of a displacement detection device according to the first embodiment. FIG. 2A and FIG. 2B are a plan view and a side view showing the configuration of the displacement detection device, respectively.

A displacement detection device 3 has a sensor IC 1 and a magnet 2 which is arranged to face a magnetic detection surface of the sensor IC 1 and serves as a detection target.

As will be described later, the sensor IC 1 is a magnetic sensor IC which detects magnetic flux densities by a plurality of Hall elements and outputs voltages proportional to the respective magnetic flux densities in an x direction and a z direction.

The magnet 2 is a permanent magnet formed by using a material such as ferrite, samarium cobalt or neodymium, in which a direction parallel to a z axis is set as a magnetization direction Dm, and a direction parallel to a y axis is set as a displacement direction Ds. Moreover, the magnet 2 is in form that is tilted by a predetermined angle θ in the displacement direction Ds. As one example, a width in the x direction is set to 3 mm, a length in the y direction is set to 20 mm, and a thickness in the z direction is set to 5 mm.

Note that the magnet 2 only needs to be displaced relatively against the sensor IC 1 so that the sensor IC 1 may be displaced while the magnet 2 is fixed, or both may be displaced together. Moreover, the magnet 2 may be connected to a different detection target to be displaced.

The sensor IC 1 and the magnet 2 are arranged in the z direction with a predetermined interval, for example, 3 mm apart.

Figure 3A:
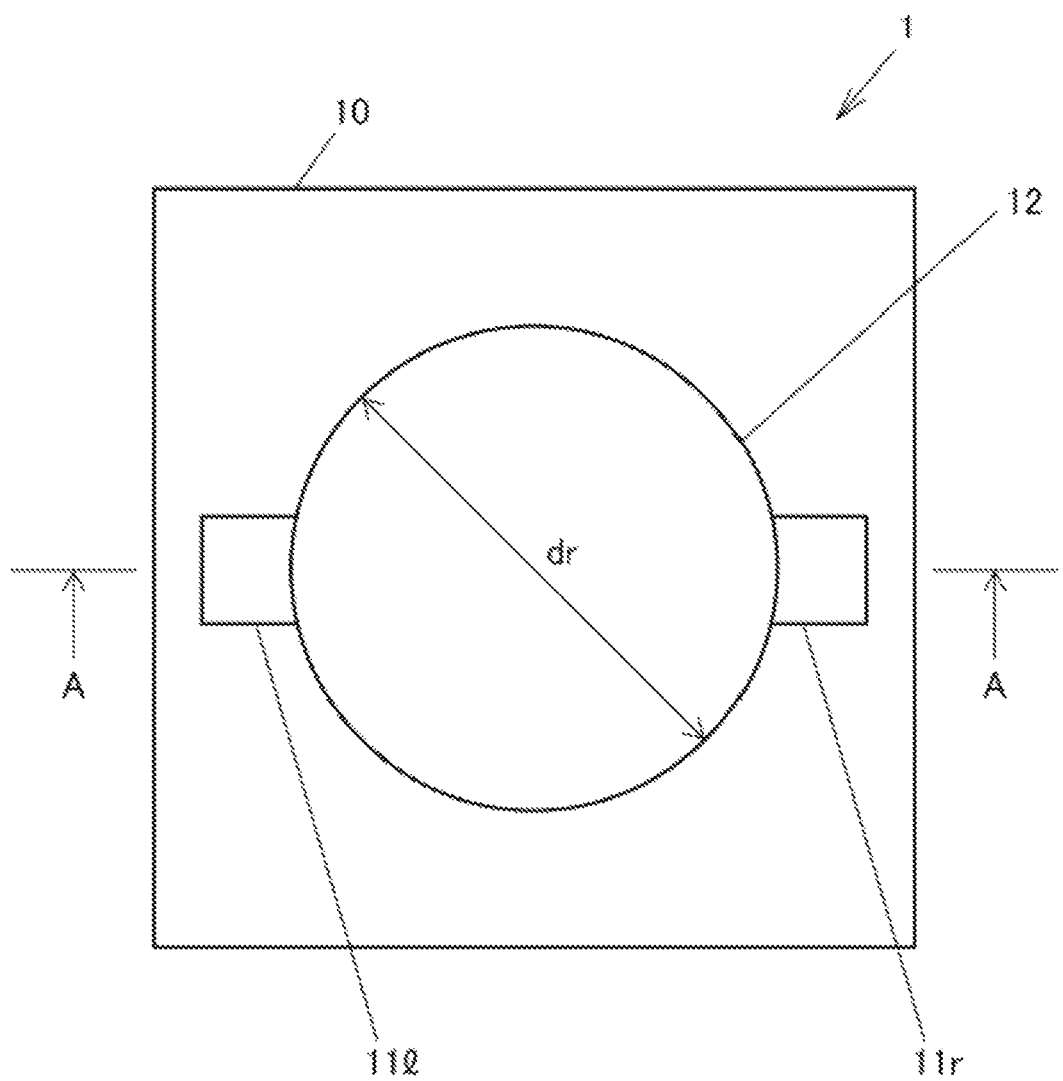
FIG. 3A and FIG. 3B are an exemplary plan view and a side view showing one example of the configuration of a sensor IC, respectively.
Figure 3B:
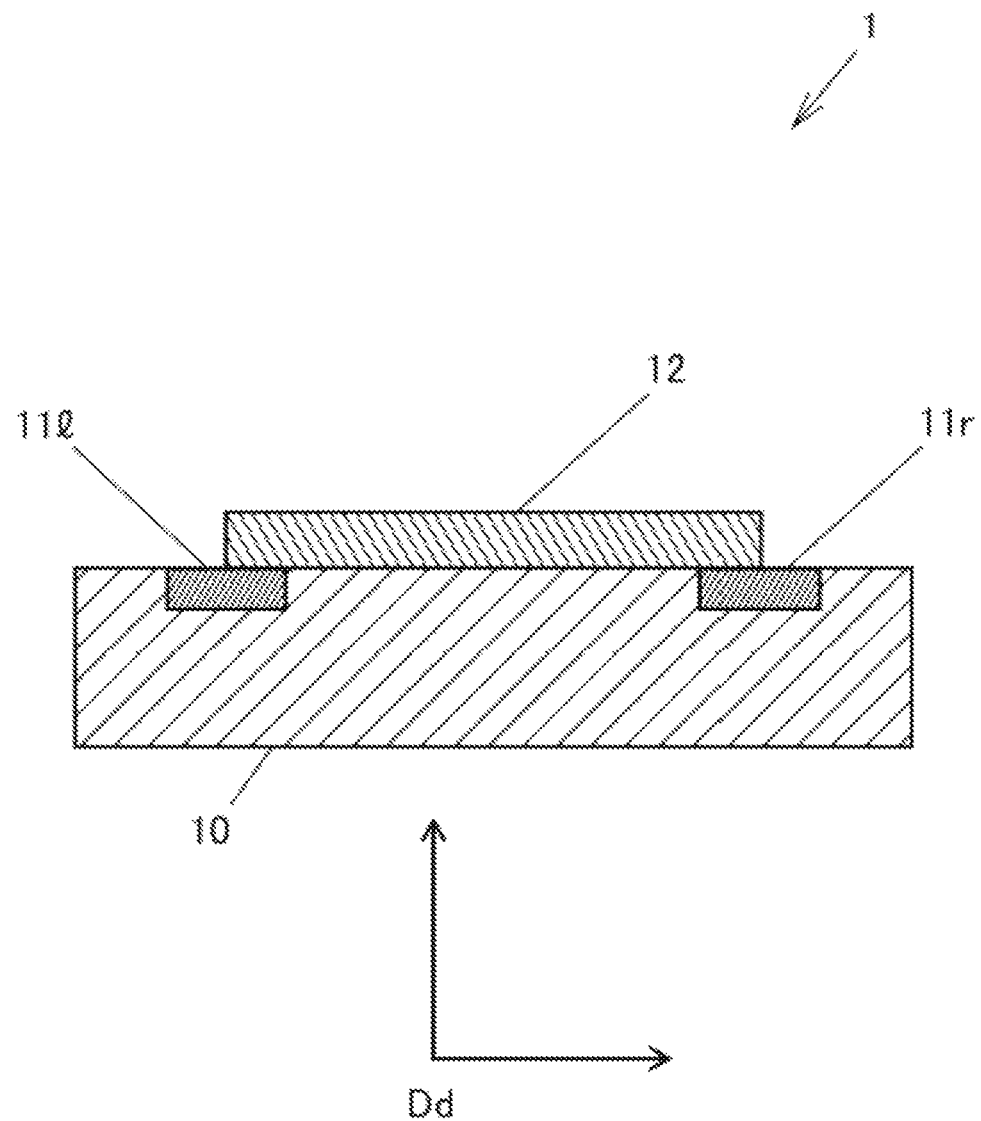

FIG. 3A and FIG. 3B are a plan view and an A-A cross-sectional view showing one example of the configuration of the sensor IC 1, respectively.

As shown in FIG. 3A and FIG. 3B, the sensor IC 1 includes, as one example, a flat substrate 10 having a thickness in the z direction, Hall elements $11_l$ and $11_r$ which are provided on the substrate 10, have detection surfaces parallel to an xy plane, and serve as magnetic detection elements of which detection direction is set to the z direction, a magnetic concentrator (IMC) 12 which is provided so as to partially overlie the Hall elements $11_l$ and $11_r$, and converts a magnetic flux in the x direction into the z direction to be detected by the Hall elements $11_l$ and $11_r$, and signal processing circuits (FIG. 5 and FIG. 6) which process signals outputted by the Hall elements $11_l$ and $11_r$, and is a Hall IC which detects the magnetic flux densities in the x and z directions. Note that a magnetic flux density in the y direction may be detected by further arranging Hall elements in the y direction.

For example, by using the MLX 90365 sensor manufactured by Melexis or the like, the sensor IC 1 computes outputs of the Hall elements $11_l$ and $11_r$ to set a sensitive directions $D_d$ to the x direction and z direction so that an output proportional to a magnetic flux density in each sensitive direction $D_d$ can be obtained. The relationships between the magnetic flux densities and the outputs will be described later. Moreover, an interval $d_r$ between the Hall elements $11_l$ and $11_r$ is substantially equal to the diameter of the IMC 12 and is 0.2 mm. Furthermore, the sensor IC 1 has a thickness of 40 μm in the z direction, a width of 2500 μm in the x direction, and a width of 2000 μm in the y direction. Note that Permalloy can be used as the IMC 12 of the sensor IC 1.

Note that, for the sensor IC 1, a different kind of elements such as an MR element may be used as long as the detection direction is the x direction and the z direction and outputs proportional to the magnetic flux densities are obtained, or a multi-axial magnetic detection IC, in which magnetic detection elements are arranged in a plurality of respective axial directions, may be used as long as the detection direction includes the x direction and the z direction.

(Operation of Displacement Detection Device)

Next, the action of the first embodiment will be described using FIG. 1 to FIG. 9.

(Operation of Sensor IC)

Figure 4:
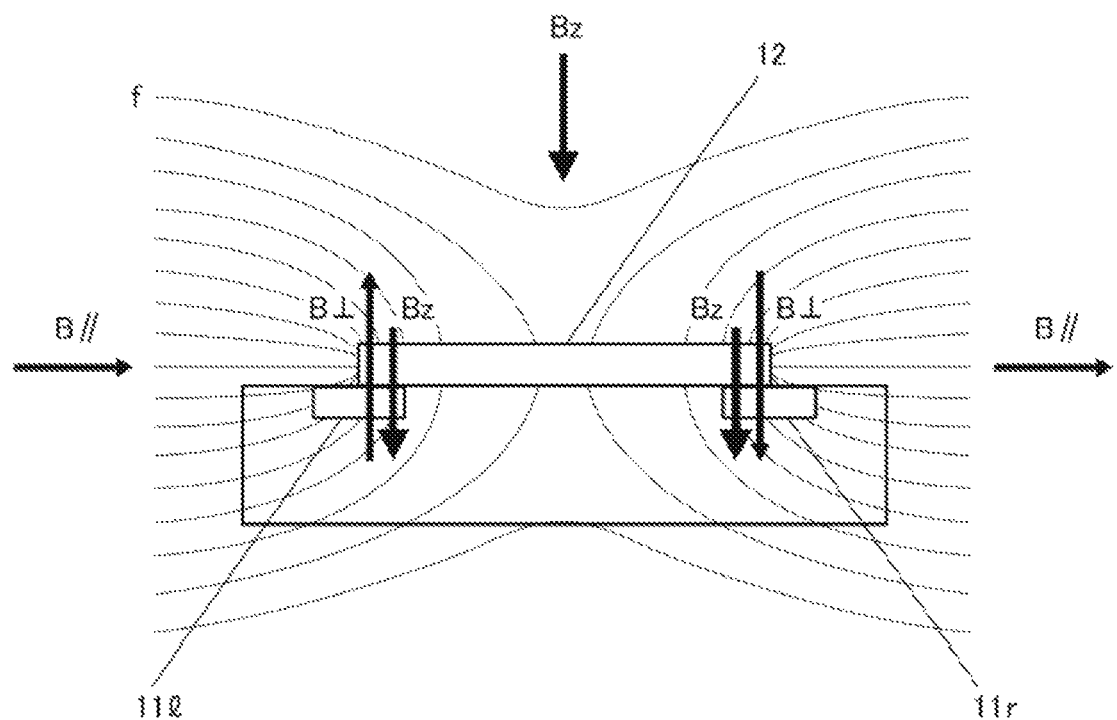
FIG. 4 is an exemplary schematic view for explaining the operation of the sensor IC of the displacement detection device.

FIG. 4 is a schematic view for explaining the operation of the sensor IC 1 of the displacement detection device 3.

The magnetic flux passing through the sensor IC 1 is sensed by the Hall elements $11_l$ and $11_r$, and a signal with a voltage proportional to the magnetic flux density is outputted.

A parallel component B// of the magnetic flux f is induced by the IMC 12 so that the magnitude of the magnetic flux density is converted into a vertical component B⊥ proportional to the parallel component B// and is sensed by the Hall elements $11_l$ and $11_r$. A vertical component $B_z$ is also sensed by the Hall elements $11_l$ and $11_r$.

In other words, the Hall element $11_l$ on the left side of the drawing senses "B⊥−$B_z$," while the Hall element $11_r$ on the right side of the drawing senses "−B⊥−$B_z$."

Therefore, by calculating a difference between the output of the Hall element $11_l$ and the output of the Hall element $11_r$, a signal with a voltage proportional to 2B⊥ can be obtained. In addition, by calculating the sum, a signal with a voltage proportional to −2Bz can be obtained.

Figure 5:
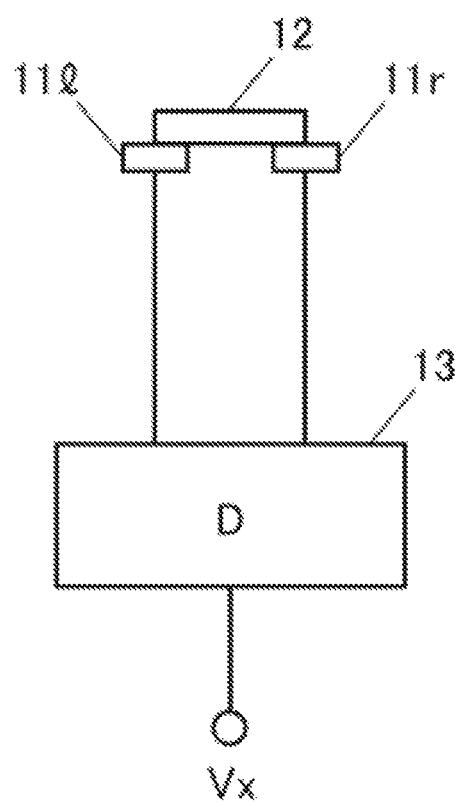
FIG. 5 is an exemplary schematic diagram showing a circuit when the sensor IC obtains an output proportional to an x component of the magnetic field.

FIG. 5 is a schematic diagram showing a circuit when the sensor IC 1 obtains an output proportional to an x component of the magnetic field. Furthermore, FIG. 6 is a schematic diagram showing a circuit when the sensor IC 1 obtains an output proportional to a z component of the magnetic field.

As shown in FIG. 5, a differential circuit 13 outputs an output difference between the Hall elements $11_l$ and $11_r$ and outputs a voltage $V_x$ proportional to 2B⊥, which is the x component of the magnetic flux density, as described above.

Figure 6:
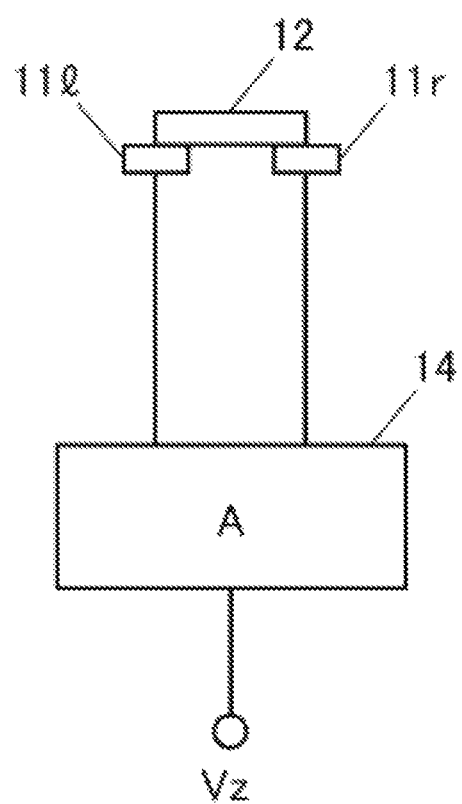
FIG. 6 is an exemplary schematic diagram showing a circuit when the sensor IC obtains an output proportional to a z component of the magnetic field.

Furthermore, as shown in FIG. 6, an adder circuit 14 outputs the sum of the outputs of the Hall elements $11_l$ and $11_r$ and outputs a voltage $V_z$ proportional to −2B⊥, which is the z component of the magnetic flux density, as described above.

Note that FIG. 5 and FIG. 6 described above are for explaining the circuit configuration of the sensor IC 1, and the outputs of the Hall elements $11_l$ and $11_r$ may be processed by an analog circuit, or the outputs may be sequentially acquired by the DEMUX to be processed by a digital circuit.

(Relationships Between Displacement of Magnet and Output Values)

Figure 7A:
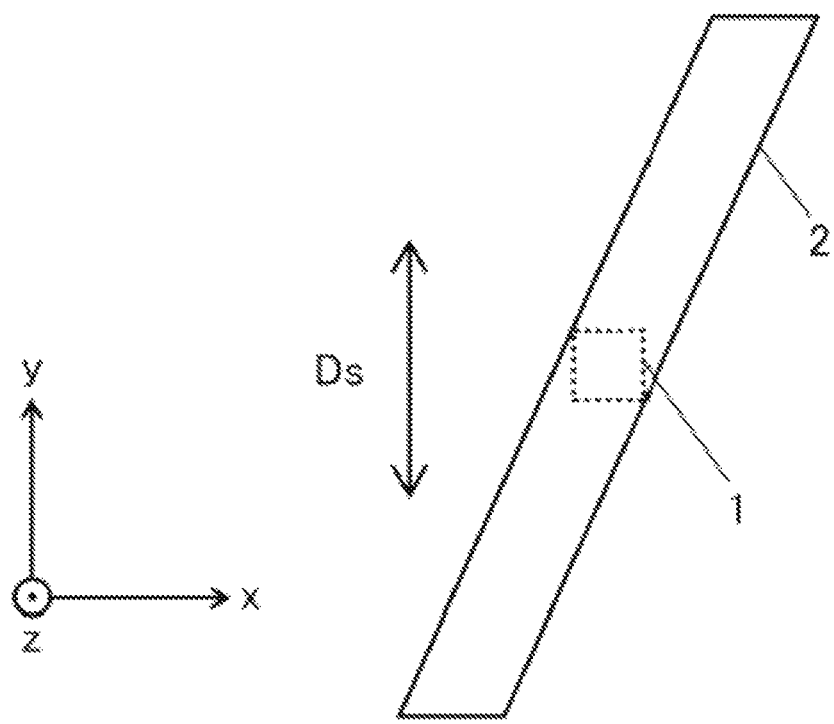
FIG. 7A to FIG. 7C are an exemplary schematic plan view showing displacement of a magnet, an exemplary schematic front view showing a state of a magnetic field formed by the magnet, and an exemplary graph showing output values outputted from a differential circuit and an adder circuit, respectively.
Figure 7B:
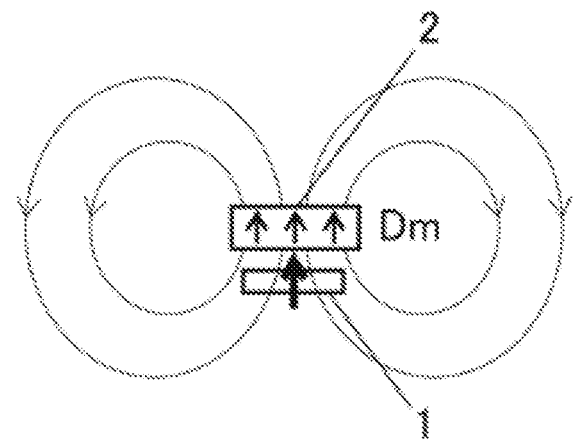
Figure 7C:
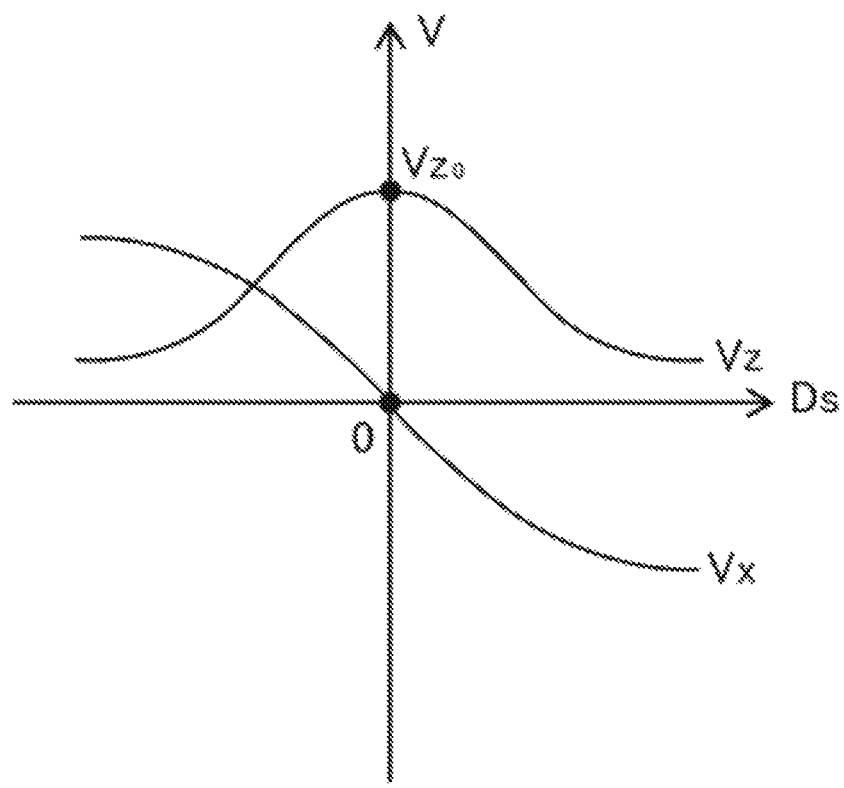

FIG. 7A to FIG. 7C are a schematic plan view showing the displacement of the magnet 2, a schematic front view showing the state of the magnetic field formed by the magnet 2, and a graph showing output values outputted from the differential circuit 13 and the adder circuit 14, respectively.

When the sensor IC 1 and the magnet 2 are not displaced relatively to each other as shown in FIG. 7A, the magnet 2 is positioned right above the sensor IC 1 as shown in FIG. 7B. Note that FIG. 7B is a cross-sectional view, which is a plane parallel to a zx plane and a plane passing through the center of the sensor IC 1 in the y direction.

In this case, the sensor IC 1 detects a magnetic flux density having a value of 0 in the x direction and the maximum value in the z direction. Therefore, as shown in FIG. 7C, the voltage $V_x$, which is the output value which is outputted from the differential circuit 13 and proportional to the x component of the magnetic field, becomes 0, and the output value $V_z$, which is outputted from the adder circuit 14 and proportional to the z component of the magnetic field, becomes $V_{z0}$.

Figure 8A:
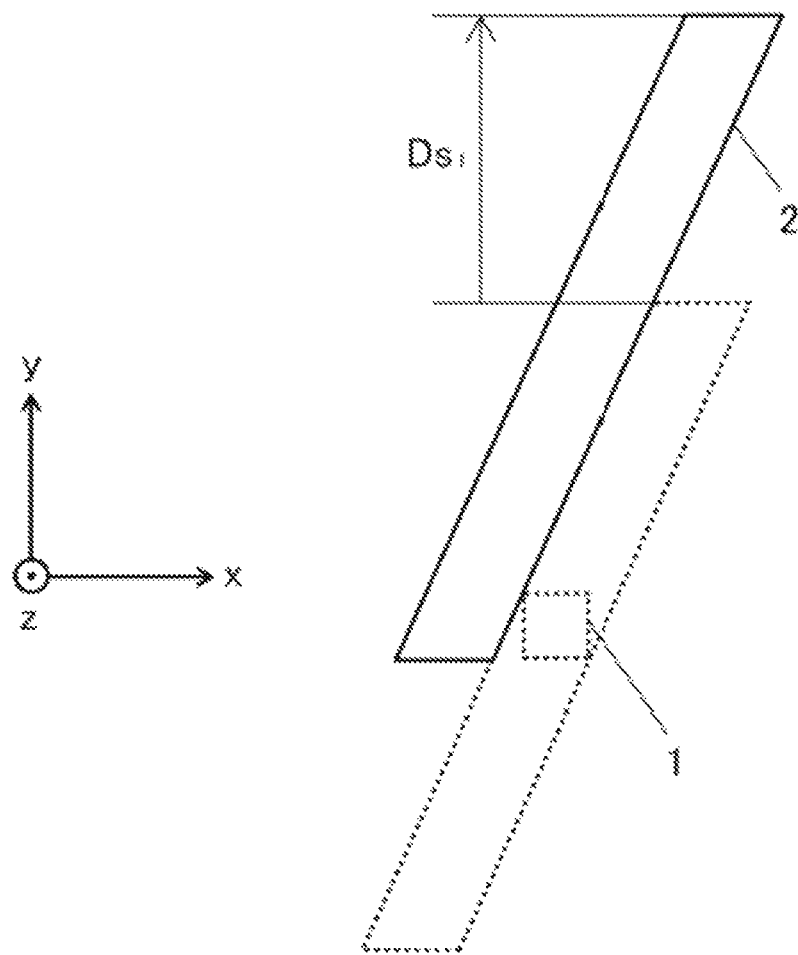
FIG. 8A to FIG. 8C are an exemplary schematic plan view showing the displacement of the magnet, an exemplary schematic front view showing the state of the magnetic field formed by the magnet, and an exemplary graph showing output values outputted from the differential circuit and the adder circuit, respectively.
Figure 8B:
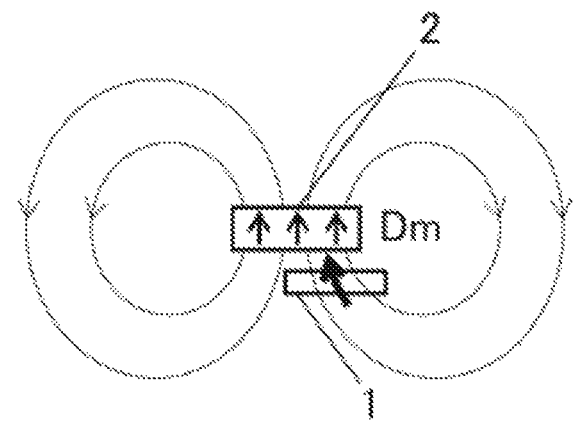
Figure 8C:
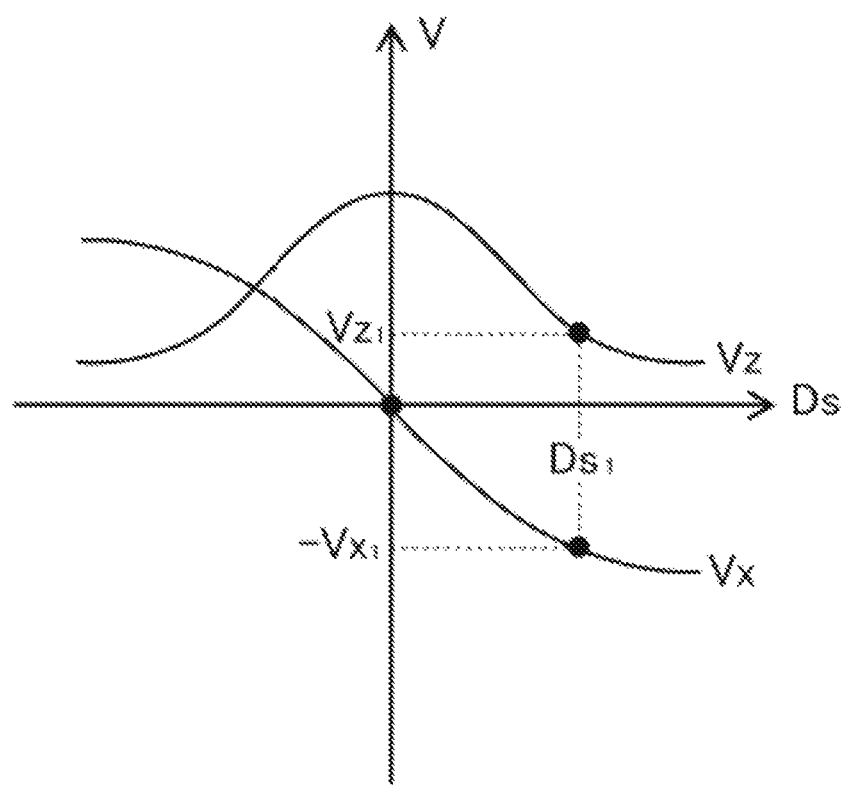

FIG. 8A to FIG. 8C are a schematic plan view showing the displacement of the magnet 2, a schematic front view showing the state of the magnetic field formed by the magnet 2, and a graph showing output values outputted from the differential circuit 13 and the adder circuit 14, respectively. Note that FIG. 8B is a cross-sectional view, which is a plane parallel to the zx plane and a plane passing through the center of the sensor IC 1 in the y direction.

When the sensor IC 1 and the magnet 2 are displaced relatively by only $D_{s1}$ as shown in FIG. 8A, the magnet 2 is positioned to the left side in the drawing above the sensor IC 1 as shown in FIG. 8B.

In this case, the sensor IC 1 detects a magnetic flux density having a negative value in the x direction and a positive value in the z direction. Therefore, as shown in FIG. 8C, the voltage $V_x$, which is the output value which is outputted from the differential circuit 13 and proportional to the x component of the magnetic field, becomes $-V_{x1}$, and the voltage $V_z$, which is the output value which is outputted from the adder circuit 14 and proportional to the z component of the magnetic field, becomes $V_{z1}$.

Figure 9A:
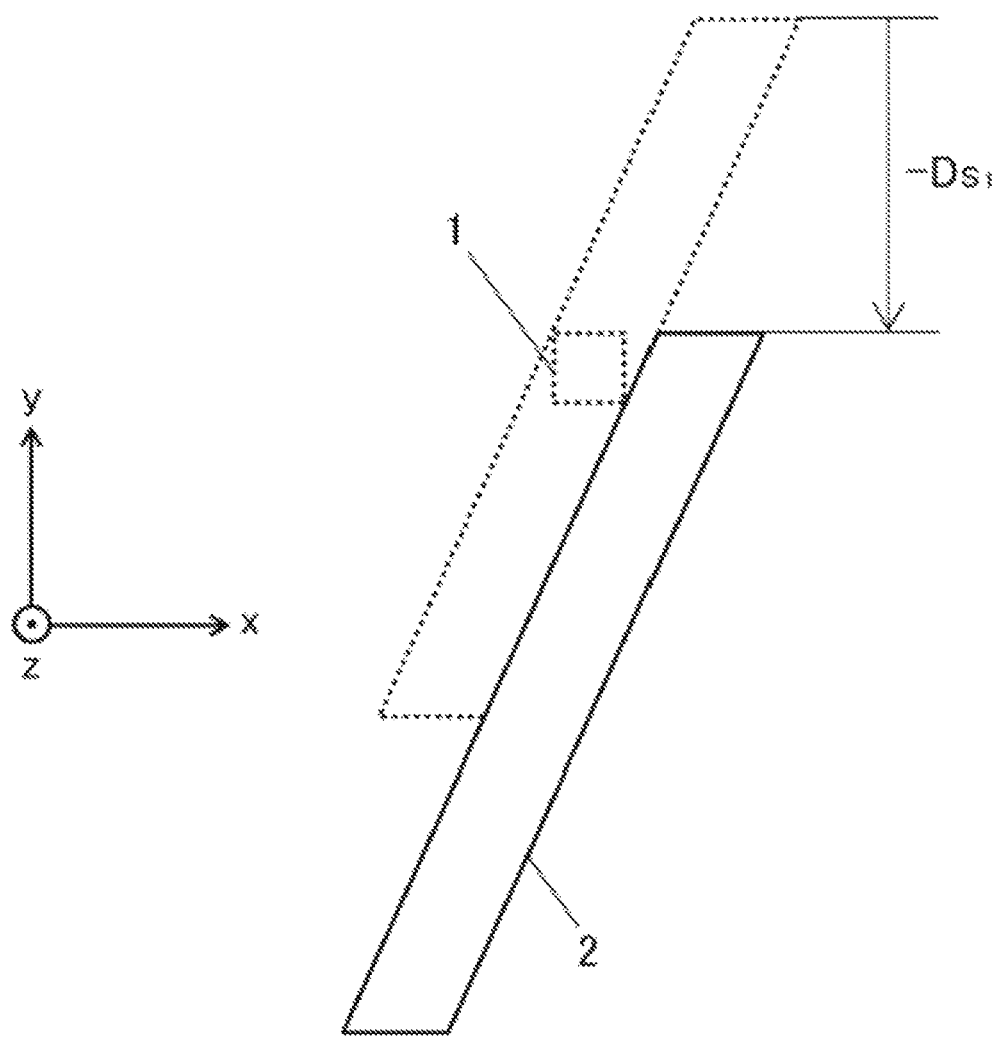
FIG. 9A to FIG. 9C are an exemplary schematic plan view showing the displacement of the magnet, an exemplary schematic front view showing the state of the magnetic field formed by the magnet, and an exemplary graph showing output values outputted from the differential circuit and the adder circuit, respectively.
Figure 9B:
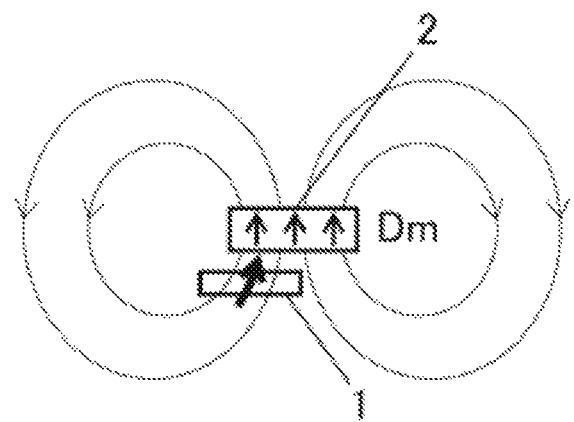
Figure 9C:
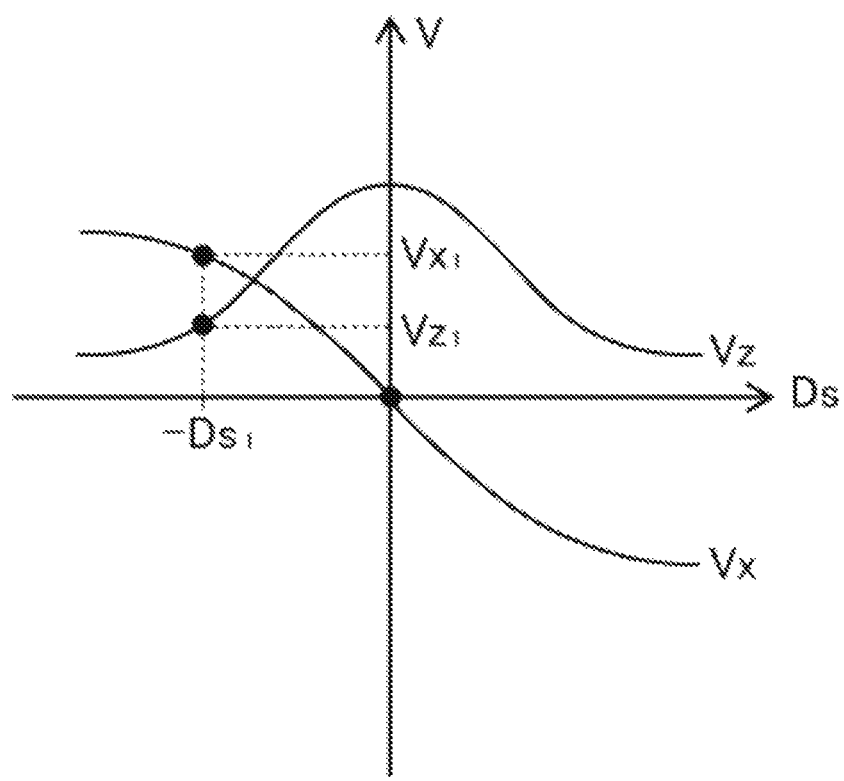

FIG. 9A to FIG. 9C are a schematic plan view showing the displacement of the magnet 2, a schematic front view showing the state of the magnetic field formed by the magnet 2, and a graph showing output values outputted from the differential circuit 13 and the adder circuit 14, respectively. Note that FIG. 9B is a cross-sectional view, which is a plane parallel to the zx plane and a plane passing through the center of the sensor IC 1 in the y direction.

When the sensor IC 1 and the magnet 2 are displaced relatively by only $D_{s1}$ as shown in FIG. 9A, the magnet 2 is positioned to the right side in the drawing above the sensor IC 1 as shown in FIG. 9B.

In this case, the sensor IC 1 detects a magnetic flux density having a positive value in the x direction and a positive value in the z direction. Therefore, as shown in FIG. 9C, the voltage $V_x$, which is the output value which is outputted from the differential circuit 13 and proportional to the x component of the magnetic field, becomes $V_{x1}$, and the voltage $V_z$, which is the output value which is outputted from the adder circuit 14 and proportional to the z component of the magnetic field, becomes $V_{z1}$.

Advantageous Effects of First Embodiment

According to the first embodiment described above, the magnet 2 is arranged on the sensor IC 1 in form tilted by a predetermined angle θ in the displacement direction Ds, and the magnetic flux in the x direction and z direction which are orthogonal to the displacement direction Ds (at least the magnetic flux in the x direction monotonically decreases) so that the displacement of the magnet 2, the detection target, can be uniquely determined from the output values of the sensor IC 1 as well as the displacement range of the detection target can be made wider than the displacement range detectable by the sensor IC 1.

That is, although the displacement range of the magnet detectable by the sensor IC 1 is about several fold $d_r$ when the displacement direction of the magnet is set to the x direction, by using the magnet 2, a value obtained by multiplying the displacement in the displacement direction Ds by tan θ becomes the displacement in the x direction. Thus, the displacement range of the magnet 2 detectable by the sensor IC 1 becomes 1/tan θ-fold in the y direction, and a larger displacement can be detected as the value of θ becomes smaller.

Second Embodiment

The second embodiment is different from the first embodiment in that the magnetization direction $D_m$ of the magnet of the first embodiment is set to be parallel to the x axis. Note that the same reference signs are used for the elements common to the first embodiment.

Figure 10:
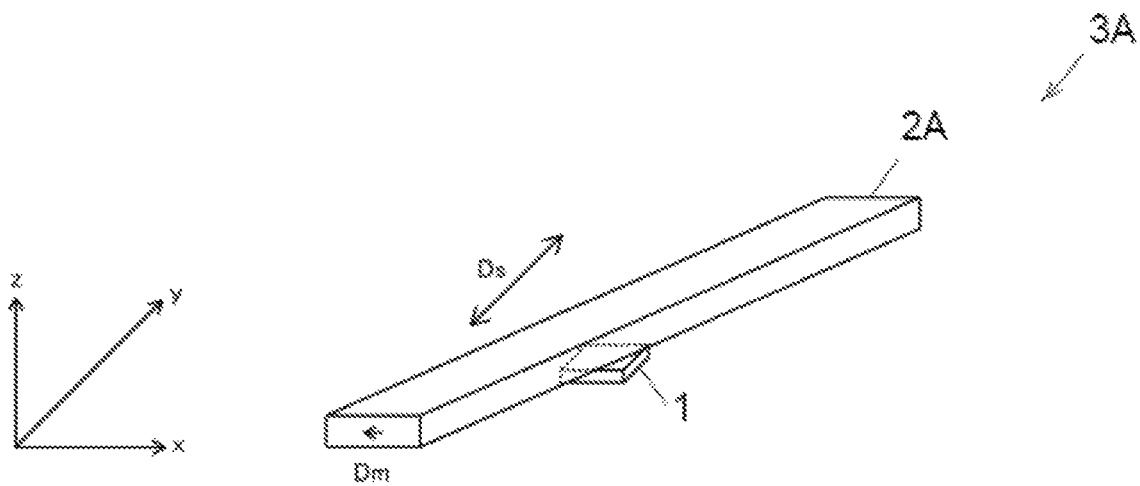
FIG. 10 is an exemplary perspective view showing a configuration example of a displacement detection device according to the second embodiment.

FIG. 10 is a perspective view showing a configuration example of a displacement detection device according to the second embodiment.

A displacement detection device 3A has a sensor IC 1 and a magnet 2A arranged above the sensor IC 1.

Like the magnet 2, the magnet 2A is a permanent magnet formed by using a material such as ferrite, samarium cobalt or neodymium, in which a direction parallel to an x axis is set as a magnetization direction Dm and a direction parallel to a y axis is set as a displacement direction $D_s$. Moreover, the magnet 2A is in form that is tilted by a predetermined angle θ in the displacement direction $D_s$. As one example, a width in the x direction is set to 3 mm, a length in the y direction is set to 20 mm, and a thickness in a z direction is set to 5 mm.

Note that the magnet 2A only needs to be displaced relatively against the sensor IC 1 so that the sensor IC 1 may be displaced, or both may be displaced.

The sensor IC 1 and the magnet 2A are arranged in the z direction with a predetermined interval, for example, 5 mm apart.

(Operation of Displacement Detection Device)

Next, the action of the second embodiment will be described using FIG. 10 and FIG. 11.

Figure 11A:
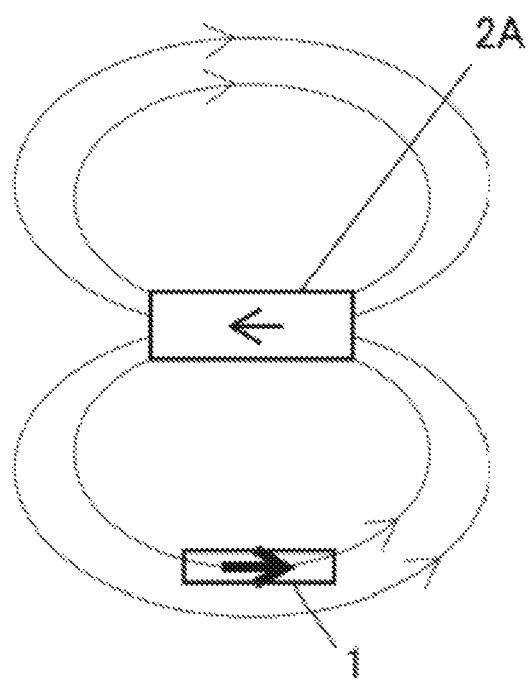
FIG. 11A, and FIG. 11B are an exemplary schematic front view showing a state of a magnetic field formed by a magnet and an exemplary graph showing output values outputted from a differential circuit and an adder circuit, respectively.
Figure 11B:
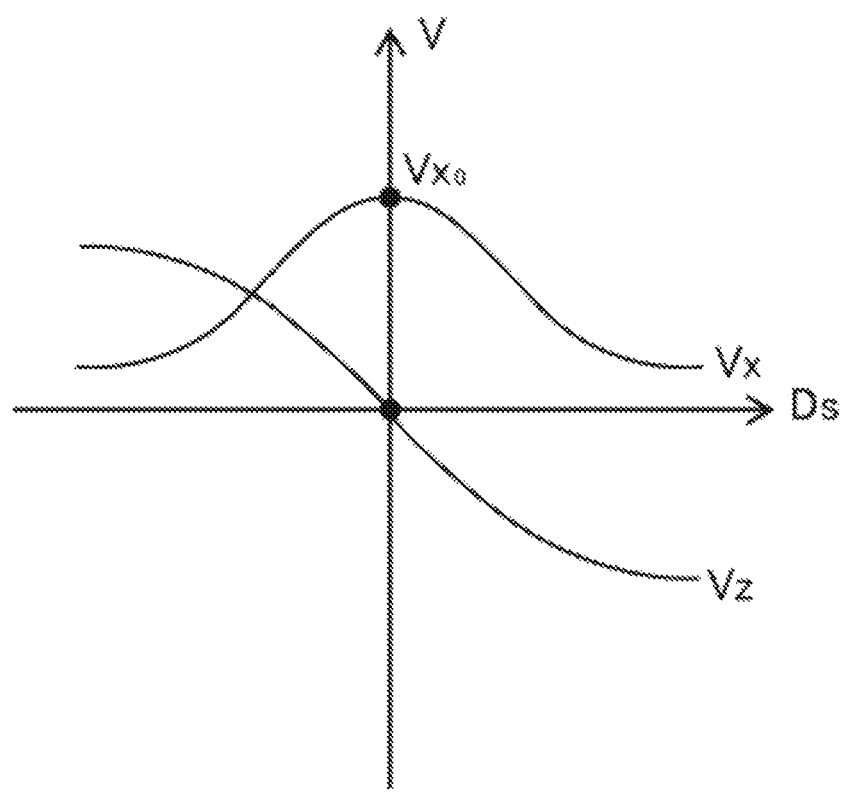

FIG. 11A and FIG. 11B are a schematic front view showing a state of a magnetic field formed by the magnet 2A and a graph showing output values outputted from a differential circuit 13 and an adder circuit 14, respectively.

When the sensor IC 1 and the magnet 2A are not displaced relatively to each other as shown in FIG. 10, the magnet 2A is positioned right above the sensor IC 1 as shown in FIG. 11A.

In this case, the sensor IC 1 detects a magnetic flux density having a positive value in the x direction and a value of 0 in the z direction. The absolute values of the magnetic flux densities in the x direction detected by the respective Hall element groups are the same, and the absolute values of the magnetic flux densities in the z direction detected by the respective Hall element groups are the same. Therefore, as shown in FIG. 11B, the voltage $V_x$, which is the output value which is outputted from the differential circuit 13 and proportional to an x component of the magnetic field, becomes $V_{x0}$, and the voltage $V_z$, which is the output value which is outputted from the adder circuit 14 and proportional to a z component of the magnetic field, becomes 0.

Moreover, the voltage $V_x$, which is the output value which is outputted from the differential circuit 13 and proportional to the x component of the magnetic field, and the voltage $V_z$, which is the output value which is outputted from the adder circuit 14 and proportional to the z component of the magnetic field, are as shown in FIG. 11B according to the displacement of the magnet 2A.

Advantageous Effects of Second Embodiment

According to the second embodiment described above, even when the magnetization direction Dm is set to the x direction, the displacement of the magnet 2A, the detection target, can be uniquely determined from the output values of the sensor IC 1 as well as the displacement range of the detection target can be made wider than the displacement range detectable by the sensor IC 1, like the first embodiment.

Other Embodiments

It should be noted that the invention is not limited to the above embodiments, and various modifications can be made in a scope without departing from the gist of the invention.

Moreover, the sensors and magnets of the first and second embodiments described above are examples, and a change can be made into a different combination by appropriately selecting each of these in a scope that the functions of the position detection are not impaired and the gist of the invention is not changed.

What is claimed is:

1. A displacement detection device, comprising:
a rod-shaped magnet configured to translationally displace in one direction, in which a longitudinal direction of the rod-shaped magnet is angled at a predetermined angle with respect to the one direction; and
a sensor configured to detect a magnetic flux density of a magnetic field formed by the rod-shaped magnet in a magnetization direction of the rod-shaped magnet, and a direction orthogonal to the one direction and the magnetization direction of the rod-shaped magnet, and output a signal proportional to the magnetic field detected.

2. The displacement detection device according to claim 1, wherein the sensor comprises: a plurality of magnetic detection elements of which sensitive direction is set to a first direction orthogonal to the one direction; and a magnetic concentrator which converts a magnetic flux in a second direction orthogonal to the one direction and the first direction into a magnetic flux in the first direction.

3. The displacement detection device according to claim 2, wherein the sensor is configured to output a signal proportional to a magnetic flux density in the first direction by adding outputs of the plurality of the magnetic detection elements and output a signal proportional to a magnetic flux density in the second direction by calculating a difference between the outputs of the plurality of the magnetic detection elements.

4. The displacement detection device according to claim 1, wherein the rod-shaped magnet has the magnetization direction in a direction orthogonal to the one direction.

5. The displacement detection device according to claim 2, wherein the rod-shaped magnet has the magnetization direction in a direction orthogonal to the one direction.

6. The displacement detection device according to claim 3, wherein the rod-shaped magnet has the magnetization direction in a direction orthogonal to the one direction.

7. A displacement detection device, comprising:
a rod-shaped magnet configured to translationally displace in one direction, in which a longitudinal direction of the rod-shaped magnet is angled at a predetermined angle with respect to the one direction; and
a sensor configured to detect a magnetic flux density of a magnetic field formed by the rod-shaped magnet in a magnetization direction of the rod-shaped magnet, and a direction orthogonal to the one direction and the magnetization direction of the rod-shaped magnet, and output a signal proportional to the magnetic field detected, wherein:
the sensor comprises: a plurality of magnetic detection elements of which sensitive direction is set to a first direction orthogonal to the one direction; and a magnetic concentrator which converts a magnetic flux in a second direction orthogonal to the one direction and the first direction into a magnetic flux in the first direction.

8. The displacement detection device according to claim 7, wherein the sensor is configured to output a signal proportional to a magnetic flux density in the first direction by adding outputs of the plurality of the magnetic detection elements and output a signal proportional to a magnetic flux density in the second direction by calculating a difference between the outputs of the plurality of the magnetic detection elements.

9. The displacement detection device according to claim 7, wherein the rod-shaped magnet has the magnetization direction in a direction orthogonal to the one direction.

10. The displacement detection device according to claim 8, wherein the rod-shaped magnet has the magnetization direction in a direction orthogonal to the one direction.

11. A displacement detection device, comprising:
a rod-shaped magnet configured to translationally displace in one direction, in which a longitudinal direction of the rod-shaped magnet in a longitudinal direction is angled at a predetermined angle with respect to the one direction; and
a sensor configured to detect a magnetic flux density of a magnetic field formed by the rod-shaped magnet in a magnetization direction of the rod-shaped magnet, and a direction orthogonal to the one direction and the magnetization direction of the rod-shaped magnet, and output a signal proportional to the magnetic field detected, wherein:
the sensor comprises: a plurality of magnetic detection elements of which sensitive direction is set to a first direction orthogonal to the one direction; and a magnetic concentrator which converts a magnetic flux in a second direction orthogonal to the one direction and the first direction into a magnetic flux in the first direction; and
the sensor is configured to output a signal proportional to a magnetic flux density in the first direction by adding outputs of the plurality of the magnetic detection elements and output a signal proportional to a magnetic flux density in the second direction by calculating a difference between the outputs of the plurality of the magnetic detection elements.

12. The displacement detection device according to claim 11, wherein the rod-shaped magnet has the magnetization direction in a direction orthogonal to the one direction.

13. The displacement detection device according to claim 1, wherein the one direction takes a straight line.

14. The displacement detection device according to claim 1, wherein the sensor is a pair of magnetic detection elements.

15. The displacement detection device according to claim 1, wherein the sensor is a pair of Hall elements.

16. The displacement detection device according to claim 1, wherein the signal proportional to the magnetic field detected is a temporal signal upon detection.

\* \* \* \* \*